(12) United States Patent
Tagawa et al.

(10) Patent No.: US 6,738,425 B2
(45) Date of Patent: May 18, 2004

(54) IMAGE OR VIDEO DATA PROCESSING SYSTEM

(75) Inventors: Haruo Tagawa, Tokyo (JP); Masahiko Misawa, Yokohama (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 343 days.

(21) Appl. No.: 09/768,215

(22) Filed: Jan. 24, 2001

(65) Prior Publication Data

US 2001/0017976 A1 Aug. 30, 2001

(30) Foreign Application Priority Data

Jan. 24, 2000 (JP) .......................... 2000-014791

(51) Int. Cl.[7] .................... H04B 1/66; H04N 5/783
(52) U.S. Cl. .............................. 375/240.12
(58) Field of Search ............... 375/240.01, 240.09, 375/240.1, 240.12, 240.13; 386/70, 111; 360/48; 348/143, 153; 711/112; H04N 5/783; H04B 1/66

(56) References Cited

U.S. PATENT DOCUMENTS

| | | | | |
|---|---|---|---|---|
| 5,381,275 A | * | 1/1995 | Nitta et al. | 360/48 |
| 5,751,893 A | * | 5/1998 | Shimoda et al. | 386/111 |
| 6,166,763 A | * | 12/2000 | Rhodes et al. | 348/143 |
| 2002/0071659 A1 | * | 6/2002 | Ando et al. | 386/70 |

FOREIGN PATENT DOCUMENTS

JP    10-276365    10/1998

* cited by examiner

*Primary Examiner*—Tung T. Vo
(74) *Attorney, Agent, or Firm*—Connolly Bove Lodge & Hutz LLP

(57) ABSTRACT

An in-frame encoding section performs in-frame compression for each frame of input image or video data to obtain in-frame compression data. A main recording medium stores the in-frame compression data. An in-frame decoding section reads the in-frame compression data from the main recording medium and obtains reproduced image or video data. A compression converting section reads a plurality of in-frame compression data from the main recording medium and converts them into an inter-frame compression data. And an output control section outputs the inter-frame compression data to an external device.

6 Claims, 4 Drawing Sheets

IMAGE OR VIDEO DATA PROCESSING SYSTEM

BACKGROUND OF THE INVENTION

The present invention relates to an image or video data processing system which records image or video signals based on a compression coding technique, and more particularly to an image or video data processing system which is preferably applied to recording and reproduction of image or video signals supplied from video cameras of a monitoring system.

According to a conventional monitoring system, a switcher is provided to selectively switch video signals of a plurality of monitor cameras and a main recording medium is provided to store the selected video signals. In this case, the video signals are converted into digital signals and processed according to an image compression technique so as to realize high quality and low cost image recording and/or reproduction.

Regarding the techniques for compressing motion pictures or time-varying images, a conventionally well known one is the MPEG (i.e., motion picture expert group) technique which utilizes a correlation of frames to reduce an overall data amount. According to the MPEG technique, differential components or correlation between two time serial frames are subjected to a discrete cosine transformation (i.e., DCT) or the like to obtain two-dimensional frequency components. The two-dimensional frequency components thus converted are subsequently subjected to a variable length encoding so as to reduce the overall data amount.

According to the MPEG technique, when a difference between two time serial frames is motionless or very small, a required data amount can be suppressed to a very small value. When the difference between two time serial frames is large, a compensation is performed based on motion vectors between two frames. Thus, the image quality can be maintained at satisfactory levels even when the compression efficiency is high.

In general, the monitoring system should respond to various requirements. For example, it is desirable to quickly and smoothly reproduce intended images stored in the main recording medium in accordance with user's designation of a specific monitor camera or a specific time. However, recoding the video signals according to the MPEG technique is inherently dependent on the correlation between two frames which are mutually time serial. In other words, the MPEG technique is a sort of prediction coding relying on the image or video data of an immediately preceding frame. Thus, when any specific image of a specific time is required, it is definitely necessary to start the reproducing operation from a fundamental frame and time sequentially perform the reproduction of succeeding frames. Otherwise, the intended image cannot be reproduced. It is fairly time consuming and complicated.

Furthermore, the main recording medium, such as a hard disk, is an internal or built-in memory which has a huge recording capacity. The image or video data processed by the compression technique is stored in the main recording medium and exclusively used for displaying the recorded images on a monitor television. It was generally difficult to reproduce the recorded image or video data by an external device.

SUMMARY OF THE INVENTION

In view of the foregoing problems, the present invention has an object to provide an image or video data processing system which is capable of easily searching an intended image or video data from the main recording medium and is capable of easily transferring the recorded image or video data to an external recording medium.

To accomplish the above and other related objects, the present invention provides an image or video data processing system comprising in-frame encoding means for performing in-frame compression for each frame of input image or video data to obtain in-frame compression data, recording means for storing the in-frame compression data, in-frame decoding means for reading out the in-frame compression data from the recording means and obtaining reproduced image or video data, compression converting means for reading out a plurality of in-frame compression data from the recording means and converting the readout plurality of in-frame compression data into an inter-frame compression data, and output control means for outputting the inter-frame compression data to an external device.

With this arrangement, the recording means stores the in-frame compression data for each frame of the input image or video data. The reproducing operation can be easily performed by searching a designated frame. When the recorded data is output to the external device, the in-frame compression data read out from the recording medium is subjected to the inter-frame compression by utilizing the correlation between frames. Thus, it becomes possible to realize a long-term recording of high quality image or video data for a recording medium having a relatively small recording capacity. Furthermore, it becomes possible to transmit the high quality image or video data via a transmission path having a relatively narrow band.

Furthermore, according to the image or video data processing system of the present invention, it is preferable that the input image or video data are time serially mixed data picked up by a plurality of image pickup means, the in-frame encoding means successively compresses the time serially mixed data for each frame to obtain the in-frame compression data, and the recording means stores an identification code of a corresponding image pickup means together with each in-frame compression data.

With this arrangement, a plurality of image or video data are successively compressed frame by frame and stored in the recording means. The reproducing operation can be easily performed by searching a designated frame. Furthermore, as the identification code of an image pickup means is recorded to together with corresponding in-frame compression data, the reproducing operation can be easily performed by searching a designated image pickup means.

Furthermore, according to the image or video data processing system of the present invention, it is preferable that the image pickup means is mounted on a rotary table, and the recording means stores a position code representing a position of the camera mounted on the rotary table together with the identification code. The position code includes various information, such as horizontal position, vertical position, zoom, focus etc.

With this arrangement, the identification code and the position code of an image pickup means are stored together with the corresponding in-frame compression data in the recording medium. Thus, it becomes possible to easily search the recorded image or video data for each image pickup means by designating both the identification code and the position code of this image pickup means.

Furthermore, according to the present invention, it is preferable that the image or video data processing system further comprises data size gaining means for detecting an original data size of the in-frame compression data read out from the recording means, recording capacity gaining means for detecting an available recording capacity of a portable recording medium storing the inter-frame compression data under control of the output control means, and code amount control means for calculating a target compression rate based on the original data size of the readout in-frame compression data detected by the data size gaining means and the recording capacity of the portable recording medium detected by the recording capacity gaining means. The code amount control means controls the compression converting means based on the calculated target compression rate so as to equalize a data amount of the inter-frame compression data with the available recording capacity of the portable recording medium.

With this arrangement, it becomes possible to control a total data amount of the inter-frame compressed image or video data. Thus, a recording amount of the compressed data in a portable recording medium can be surely predicted.

Furthermore, according to the present invention, it is preferable that the image or video data processing system further comprises general interface means for transmitting the in-frame compression data read out from the recording means to the compression converting means which has a capability of judging image or video data.

With this arrangement, presence of the general interface means makes it possible to separately arrange the portion including the recording means from the portion including the compression converting means. Using the general interface makes it possible to judge image or video data. When no fetching of the inter-frame compression data is required, it becomes possible to remove a portion accommodating the compression converting means. Therefore, it becomes possible to suppress increase of system costs.

Furthermore, according to the image or video data processing system of the present invention, it is preferable that the compression converting means converts the in-frame compression data into the inter-frame compression data according to the MPEG2 technique, and the output control means records the inter-frame compression data into a DVD-RAM disk with a format conformable to a DVD video recording standard.

With this arrangement, when the MPEG2 technique is used to perform the inter-frame compression data, the inter-frame compressed data can be recorded into a DVD-RAM disk according to the format conformable to the DVD video recording standard. This makes it possible to easily reproduce the recorded image or video data on a personal computer or a comparable home-use reproducing or playback device.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF PREFERRED EMBODIMENTS

Figure 1:
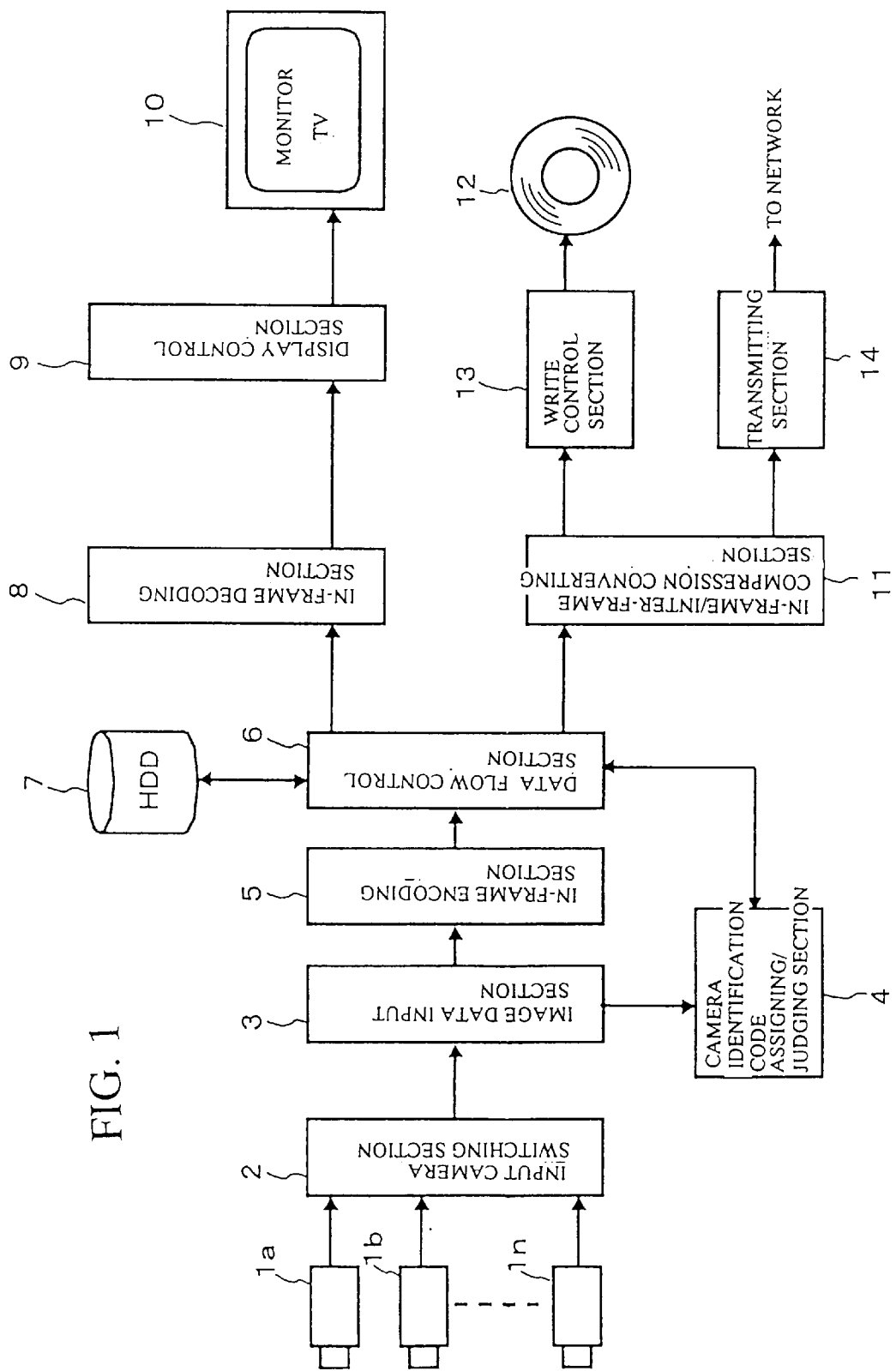
FIG. 1 is a block diagram showing an image or video data processing system in accordance with a first embodiment of the present invention.

Hereinafter, preferred embodiments of the present invention will be explained with reference to the attached drawings. Identical parts are denoted by the same reference numerals throughout the views.

First Embodiment

FIG. 1 is a block diagram showing an image or video data processing system in accordance with a first embodiment of the present invention.

The image or video data processing system of the first embodiment chiefly consists of a recording system arrangement and a reproducing system arrangement. The recording system arrangement comprises a plurality of monitoring video cameras 1a~1n each serving as an image pickup device, an input camera switching section 2, an image data input section 3, a camera identification code assigning/judging section 4, an in-frame encoding section 5, a data flow control section 6, and a main recording medium 7 such as a hard disk having a large recording capacity.

The reproducing system arrangement comprises an in-frame decoding section 8 connected to the data flow control section 6, a display control section 9, and a monitor television 10 which serves as an image display device.

Furthermore, the reproducing system arrangement comprises an in-frame/inter-frame compression converting section (hereinafter, referred to as compression converting section) 11 which is connected to the data flow control section 6, a write control section 13 which controls recording of inter-frame compressed image or video data into a portable recording medium 12, and a transmitting section 14 which transmits the inter-frame compressed image or video data to an external device via a network. Although not shown in the drawing, the image or video data processing system of the first embodiment comprises an overall control section for controlling this system and an operating section for allowing an operator to input predetermined recording and/or reproducing instructions. The write control section 13 and the transmitting section 14 cooperatively constitute an output control section.

Figure 2:
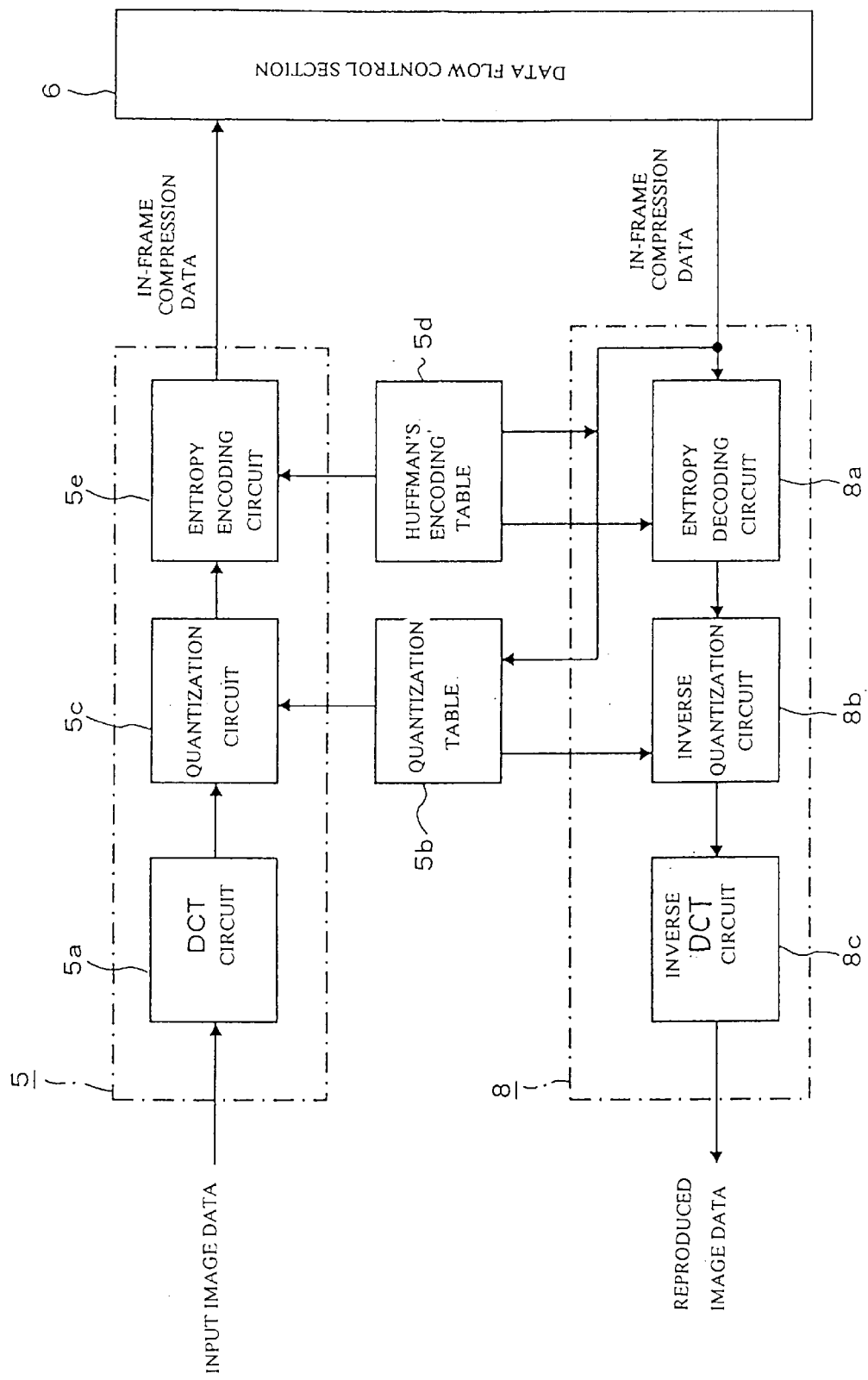
FIG. 2 is a block diagram showing a detailed arrangement of an in-frame encoding section and an in-frame decoding section of the image or video data processing system in accordance with the first embodiment of the present invention.

FIG. 2 is a block diagram showing a detailed arrangement of the in-frame encoding section 5 and the in-frame decoding section 8 together with the data flow control section 6. A practical in-frame compression of this embodiment is performed, for example, based on the JPEG (Joint Photographic Experts Group) technique.

The in-frame encoding section 5, based on the JPEG technique, comprises a DCT circuit 5a, a quantization circuit 5c, and an entropy encoding circuit 5e. The DCT circuit 5a dissects an input image or video data into a plurality of matrix blocks defined by 8 vertical pixels×8 lateral pixels, and performs a discrete cosine transformation (DCT) for each of the dissected blocks. The quantization circuit 5c performs a linear quantization with a quantization width which is differently set for each coefficient position (i.e., frequency) and stored in a quantization table 5b. The entropy encoding circuit 5e performs an entropy encoding for each of DC coefficients and AC coefficients of the quantized DCT coefficients with reference to a Huffman's encoding table 5d, and produces in-frame compression data.

The in-frame decoding section 8, based on the JPEG technique, comprises an entropy decoding circuit 8a, an inverse quantization circuit 8b, and an inverse DCT circuit 8c. To reproduce the in-frame compressed data, the decoding processing performed by the in-frame decoding section 8 is substantially opposite to the encoding processing performed by the in-frame encoding section 5. The entropy decoding circuit 8a decodes each quantized DCT coefficient. The inverse quantization circuit 8b applies an inverse quantization to the decoded quantized DCT coefficient to reconstruct the DCT coefficient. The inverse DCT circuit 8c applies an inverse discrete cosine transformation to the reconstructed DCT coefficient to output a reproduced image or video data.

An operation of the image or video data processing system in accordance with the first embodiment will be explained hereinafter. The input camera switching section 2 selects one of analog video signals produced from video cameras 1a~1n. The image data input section 3 receives the analog video signal selected by the input camera switching section 2. In this manner, the image data input section 3 receives time serially mixed image or video data which are picked up by a plurality of video cameras 1a~1n.

The image data input section 3 converts the received analog video signal into a digital signal. The in-frame encoding section 5 receives a required frame of the image or video data from the image data input section 3. The camera identification code assigning/judging section 4 receives a camera identification code, a position code, and a time code from the image data input section 3. The camera identification code is used to discriminate each of the video cameras 1a~1n. The position code represents various information (e.g., horizontal position, vertical position, zoom, focus, etc.) of the selected video camera mounted on a dedicated rotary table. The time code represents the pickup time of an image taken by the selected video camera.

The in-frame encoding section 5 compresses the received frame of image or video data sent from the image or video data input section 3 to produce an in-frame compression data. More specifically, the DCT circuit 5a dissects the input image or video data into a plurality of matrix blocks defined by 8 vertical pixels×8 lateral pixels, and performs a discrete cosine transformation for each of the dissected blocks. Thus, the input image or video data is converted into two-dimensional frequency components. Next, the quantization circuit 5c performs the linear quantization and the entropy encoding circuit 5e performs the entropy encoding, thereby reducing an overall data amount.

The in-frame compression data thus obtained is stored in the main recording medium 7 together with the camera identification code, the position code, and the time code corresponding to this in-frame compression data as well as with other data under control of the data flow control section 6.

A reproducing or playback operation for the in-frame compression data thus stored in the main recording medium 7 will be explained hereinafter. In the reproducing or playback operation, designations of video camera, position, and image pickup time are performed by the operating section (not shown).

The data flow control section 6 searches the main recording medium 7 and reads out an intended in-frame compression data corresponding to the camera identification code, position code, and time data of the designated video camera. The readout in-frame compression data is sent to the in-frame decoding section 8.

The in-frame decoding section 8 decodes the in-frame compression data read out from the main recording medium 7 under control of the data flow control section 6, and converts the decoded data into reproduced image or video data. Namely, the in-frame decoding section 8 applies the entropy decoding, the inverse quantization, and the inverse discrete cosine transformation to the in-frame compression data, thereby generating the reproduced image or video data.

The operating section (not shown) allows an operator to select a display mode. When the display mode is selected, the display control section 9 converts the reproduced image or video data into an analog video signal. Then, horizontal and vertical sync signals are added to the analog video signal to form a reproduced video signal. The display control section 9 sends the reproduced video signal to the monitor television 10. The monitor television 10 displays an image of the received video signal on its screen.

Furthermore, the operating section allows the operator to select a recording mode to transfer the in-frame compression data stored in the main recording medium 7 to the external portable recording medium 12, such as DVD (i.e., Digital Versatile Disk) or allows the operator to select a transmission mode to transmit the in-frame compression data to an external device via the network. When the transfer mode or the transmission mode is selected, the data flow control section 6 reads out a plurality of frames of the in-frame compression data from the main recording medium 7 which are time serial and correspond to the designated camera identification code or correspond to both the camera identification code and the position code.

The compression converting section 11 expands the in-frame compression data supplied from the data flow control section 6 to digitized baseband signals and then performs an inter-frame compression i.e., a moving picture or time-varying image compression. For example, the above-described MPEG (motion picture expert group) technique is practically preferable for the inter-frame compression.

The inter-frame compressed image or video data is stored in the portable recording medium 12 together with data required for reading out image or video data from the portable recording medium 12 under control of the write control section 13. For example, when a personal computer accesses the portable recording medium 12, the data required for reading out image or video data from the portable recording medium 12 must be conformable to the format of a file system used in this personal computer.

Furthermore, when the inter-frame compressed image or video data is transmitted via a network, the transmitting section 14 adds information required for network transmission to the inter-frame compressed image or video data. Then, the transmitting section 14 divides the mixed data into an appropriate size of transmission data for the network transmission and transmits the divided transmission data.

As described above, the main recording medium 7 stores the image or video data being compressed for each frame. Therefore, it becomes possible to quickly and easily perform search and reproduction of an intended frame of image or picture. This is essentially important for the image or video data processing system used for monitoring purposes. However, compressing the image or video data for each frame possibly enlarges the data size of time serially recorded images. In other words, it will significantly limit the recordable time or volume of the portable recording medium 12 since the recording capacity of the portable recording medium 12 is generally small.

Accordingly, in the case of making a copy of the image or video data removable by means of the portable recording medium 12, it is preferable to perform a re-compression of the compressed data by using an additional compression technique which utilizes inter-frame correlation and assures a high compression rate. This will reduce the overall amount of image or video data and enlarge the recordable time. Furthermore, the data amount transmitted to the outside can be reduced. Therefore, this makes it possible to transmit information as much as possible in spite of restrictions incurred to the transmission rate of an available transmission path.

As apparent from the foregoing description, the first embodiment provides an image or video data processing system comprising in-frame encoding means for performing in-frame compression for each frame of input image or video data to obtain in-frame compression data, recording means for storing the in-frame compression data, in-frame decoding means for reading out the in-frame compression data from the recording means and obtaining reproduced image or video data, compression converting means for reading out a plurality of in-frame compression data from the recording means and converting the readout plurality of in-frame compression data into an inter-frame compression data, and output control means for outputting the inter-frame compression data to an external device.

Preferably, the input image or video data are time serially mixed data picked up by a plurality of image pickup means. The in-frame encoding means successively compresses the time serially mixed data for each frame to obtain the in-frame compression data. And, the recording means stores an identification code of a corresponding image pickup means together with each in-frame compression data.

Preferably, the image pickup means is mounted on a rotary table, and the recording means stores a position code representing at least a position of the rotary table together with the identification code.

Second Embodiment

Figure 3:
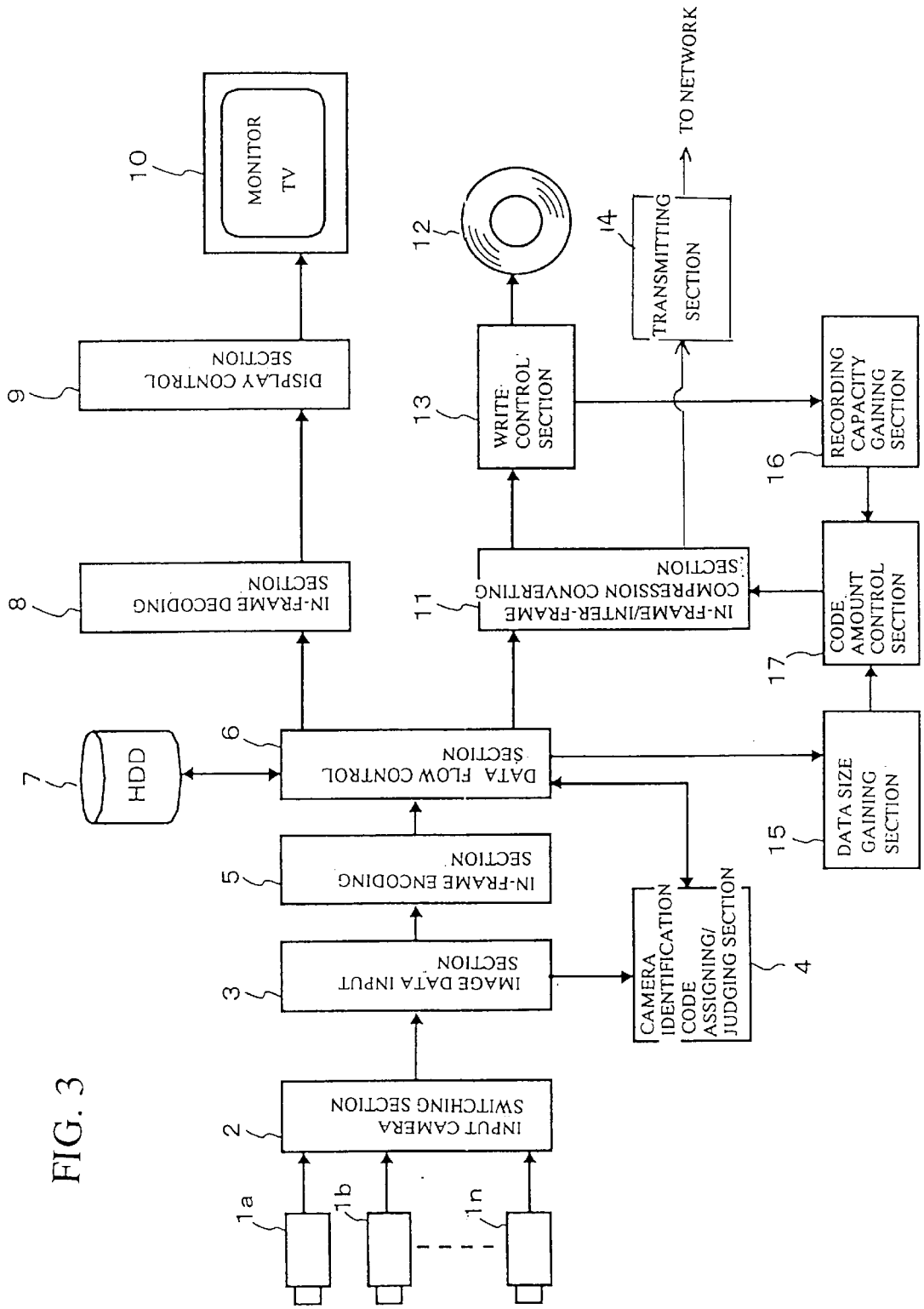
FIG. 3 is a block diagram showing an image or video data processing system in accordance with a second embodiment of the present invention.

FIG. 3 is a block diagram showing an image or video data processing system in accordance with a second embodiment of the present invention.

The image or video data processing system of the second embodiment comprises, in addition to the components disclosed in FIG. 1, a data size gaining section 15, a recording capacity gaining section 16, and a code amount control section 17. The data size gaining section 15, connected to the data flow control section 6, detects an original data size of the in-frame compression data read out from the main recording medium 7 under the control of the data flow control section 6. The recording capacity gaining section 16, connected to the write control section 13, detects an available recording capacity of the portable recording medium 12. The code amount control section 17 calculates a target compression rate of the compression converting section 11 based on the original data size of the readout in-frame compression data detected by the data size gaining section 15 and the available recording capacity of the portable recording medium 12 detected by the recording capacity gaining section 16. The code amount control section 17 controls the compression converting section 11 based on the calculated target compression rate.

More specifically, when Do represents the original data size of the in-frame compression data detected by the data size gaining section 15 and Dc represents the available recording capacity of the portable recording medium 12 detected by the recording capacity gaining section 16, the target compression rate (CT) calculated by the code amount control section 17 is expressed by the following formula.

$$CT=Dc/Do$$

During the compressing operation, the code amount control section 17 continuously monitors a cumulative code data amount and dynamically or instantaneously changes the target compression rate so as to equalize the finally obtained code data amount with the available recording capacity of the portable recording medium 12. The target compression rate CT(t) at time t is expressed by the following formula.

$$CT(t)=CT(0)\times\{AC(t)/TC(t)\}\times\alpha$$

where CT(0) represents an initial value of the target compression rate, AC(t) represents an actual code amount as of time t, TC(t) represents a target code amount as of time t, and α represents a coefficient used for the purpose of preventing the target compression rate from varying widely.

Regarding the in-frame compression data, the size of the obtained image or video data is generally dependent on contents of the image, such as rapidness of a moving picture. The compressed data amount may fluctuate greatly. It is therefore very difficult to predict how much image or video data can be stored in the portable recording medium 12 whose recordable capacity is limited. However, this embodiment makes it possible to control the data amount obtainable after the compression. Thus, it is possible to accurately predict the data amount stored in the portable recording medium 12. In other words, an exchange time of the portable recording medium 12 can be accurately estimated beforehand.

When the compression converting section 11 performs the in-frame compression according to the MPEG2 technique, the write control section 13 functions as a formatter for producing a universal disk format (i.e., UDF) on a disk which is a logical file system for a DVD-RAM. Furthermore, the write control section 13 has a function of producing a file system conformable to the "DVD video recording standard" to be constructed on the UDF. Thus, the write control section 13 can record the image or video data as well as write the related information for the recorded image or video data to the disk.

Recording the image or video data according to the format conformable to the "DVD video recording standard" in this manner makes it possible to easily reproduce the recorded image or video data on a personal computer or a comparable home-use reproducing or playback device. Accordingly, it becomes possible to solve the problems of data compatibility or dedicated apparatus which are inherent in the digital image or video data processing system provided for monitoring purposes.

As described above, in addition to the features described in the first embodiment, the image or video data processing system of this embodiment further comprises data size gaining means for detecting an original data size of the in-frame compression data read out from the recording means, recording capacity gaining means for detecting an available recording capacity of a portable recording medium storing the inter-frame compression data under control of the output control means, and code amount control means for calculating a target compression rate of the compression converting means based on the original data size of the readout in-frame compression data detected by the data size gaining means and the available recording capacity of the portable recording medium detected by the recording capacity gaining means. The code amount control means controls the compression converting means based on the calculated target compression rate so as to equalize a data amount of the inter-frame compression data with the recording capacity of the portable recording medium.

Preferably, the compression converting means converts the in-frame compression data into the inter-frame compression data according to the MPEG2 technique, and the output control means records the inter-frame compression data into a DVD-RAM disk with a format conformable to a DVD video recording standard.

Third Embodiment

Figure 4:
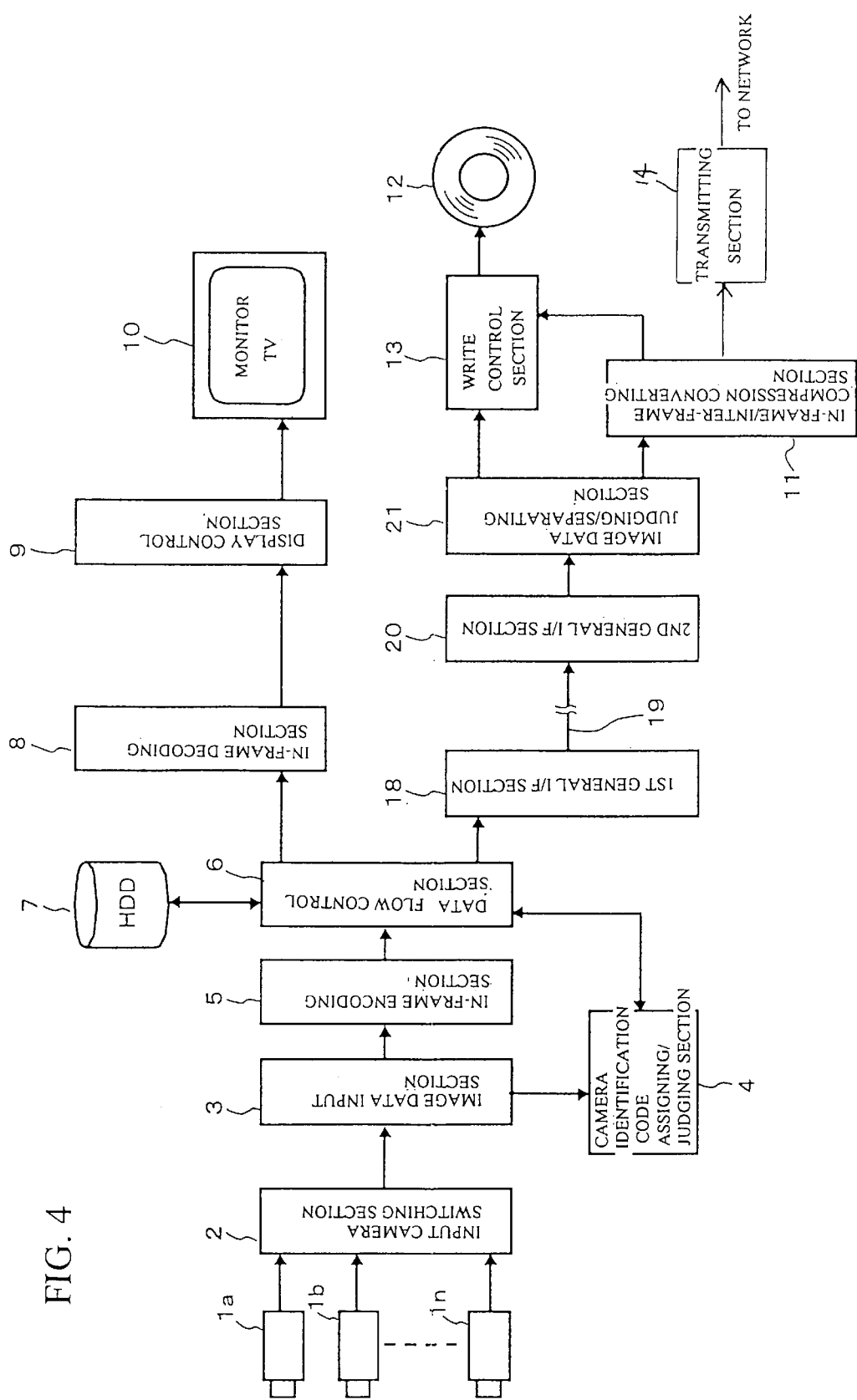
FIG. 4 is a block diagram showing an image or video data processing system in accordance with a third embodiment of the present invention.

FIG. 4 is a block diagram showing an image or video data processing system in accordance with a third embodiment of the present invention.

The image or video data processing system of the third embodiment comprises, in addition to the components disclosed in FIG. 1, a first general interface (i.e., I/F) section 18, a signal transmission line 19, a second general I/F section 20, and an image data judging/separating section 21. The first general I/F section 18 receives the image or video data read out from the main recording medium 7 under the control of the data flow control section 6 and transmits the readout image or video data to the second general I/F section 20 via the signal transmission line 19. The image data judging/separating section 21, connected to the second general I/F section 20, judges and separates the in-frame compression data into general data and the image or video data. The compression converting section 11 converts the separated image or video data into inter-frame compression data. The write control section 13 records the inter-frame compressed image or video data together with the separated general data into the portable recording medium 12. Although not shown in the drawing, the image or video data processing system of the third embodiment comprises an overall control section for controlling this system and an operating section for allowing an operator to input predetermined recording and/or reproducing instructions.

Next, a reproducing or playback operation for the in-frame compression data stored in the main recording medium 7 will be explained hereinafter. In the reproducing or playback operation, designations of video camera, position, and pickup time are performed by the operating section (not shown).

The data flow control section 6 searches the recorded data of the main recording medium 7 and reads out an in-frame compression data corresponding to the camera identification code and time data of the designated video camera. The first general I/F section 18 transmits the readout in-frame compression data to the second general I/F section 20 via the signal transmission line 19.

The first general I/F section 18 and the second general I/F section 20 are, for example, SCSI (i.e., Small Computer SystemInterface), IDE (i.e., Integrated Device Electronics) and IEEE (i.e., Institute of Electrical and Electronics Engineers) which are provided for regulating communication protocol and electric properties for data communication between two or a plurality of components.

When seen from the data transmitter side, the second general I/F section 20 and succeeding data receiver side can be regarded as a mere recording apparatus. The image data judging/separating section 21 discriminates the general data from the image or video data with reference to specific data structure peculiar to the compression method of the image or video data. For example, the specific data structure is a header of the image or video data. In general, the header stores a parameter relevant to compression and is attached to the compressed image or video data. Thus, the header and the compressed image or video data are stored or transmitted together.

When performing expansion of the JPEG data, the personal computer refers to an external identifier of a file to check the presence of JPEG data as well as refers to a header to check a pixel number, a sampling space, and a constant used for the compression, thereby performing the expansion of JPEG data. In this case, the transmitter side can perform the data transmission without checking the arrangement of a receiver side.

The compression converting section 11 expands the separated in-frame compression data to digitized baseband signals and then performs an inter-frame compression i.e., a moving picture or time-varying image compression. For example, the above-described MPEG technique is practically preferable for the inter-frame compression.

The inter-frame compressed image or video data is stored in the portable recording medium 12 together with data required for reading out image or video data from the portable recording medium 12 under control of the write control section 13. For example, when a personal computer accesses the portable recording medium 12, the data required for reading out image or video data from the portable recording medium 12 must be conformable to the format of a file system used in this personal computer. Regarding the method of judging the image or video data, it is preferable that the transmitter side transmits the data to a specific region to explicitly notify the receiver side of presence of the image or video data.

For example, it is assumed that the portable recording medium 12 provided at the data receiver side administrates each recording unit of the recording area with a serial number which is generally referred to as an address. Thus, the following relationship is established.

Overall recording capacity=Recording administration unit×Maximum address number

For example, when actual addresses of the recording area is 1 to 100, it is determined that a data written in the next address 101 is an image or video data. Inherently, the address 101 is an address to which nothing is written. It is therefore possible to judge that a write request to the address 101 is special. The merit of this system is requiring no function of interpreting the structure of image or video data. Thus, the circuit and the control software can be simplified.

As apparent from the foregoing description, this embodiment uses general interfaces to separate a portion incorporating the main recording medium from a portion incorporating the portable recording medium. This is advantageous in that a portion accommodating the portable recording medium can be removed when no fetching of the inter-frame compression data is required. It becomes possible to suppress increase of system costs.

Even when the fetching of the inter-frame compression data is required, using the arrangement of this embodiment makes it possible to suppress the increase of system costs rather than using dedicated interfaces. Furthermore, using general interfaces makes it easy to install an additional recording medium on the same interface to expand the recordable time.

As described above, in addition to the features described in the first embodiment, the image or video data processing system of this embodiment further comprises general interface means for transmitting the in-frame compression data read out from the recording means to the compression converting means which has a capability of judging image or video data.

As apparent from the foregoing description, the present invention applies the in-frame compression on the image or video data picked up by the image pickup device and stored the compressed data into the main recording medium. Thus, in the reproducing or playback operation, search of the stored image or video data can be performed by the unit of frame. Thus, the image or video data of an intended frame is easily reproduced or played back. Furthermore, the present invention applies the inter-frame compression on the stored image or video data when they are transferred to the external portable recording medium. Thus, the present invention provides an image or video data processing system which is capable of realizing long-term recording of high-quality image or video data in the external portable recording medium which has a relatively small recording capacity and is also capable of realizing easy reproduction by an external reproducing apparatus or backup of a recording medium.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An image or video data processing system comprising:
   in-frame encoding means for performing in-frame compression for each frame of input image or video data to obtain in-frame compression data;
   recording means for storing said in-frame compression data;
   in-frame decoding means for reading out said in-frame compression data from said recording means and obtaining reproduced image or video data;
   compression converting means for reading out a plurality of in-frame compression data from said recording means and converting the readout plurality of in-frame compression data into inter-frame compression data;
   output control means for outputting said inter-frame compression data to an external device; and
   means for allowing said compression converting means to carry out inter-frame compression under a condition whereby said in-frame compression by said in-frame encoding means is performed, so that recording of said in-frame compression data by said recording means is not interrupted by the output of said inter-frame compression data.

2. The image or video data processing system in accordance with claim 1, wherein
   said input image or video data are time serially mixed data picked up by a plurality of image pickup means,
   said in-frame encoding means successively compresses said time serially mixed data for each frame to obtain said in-frame compression data, and
   said recording means stores an identification code of a corresponding image pickup means together with each in-frame compression data.

3. The image or video data processing system in accordance with claim 2, wherein
   said image pickup means is mounted on a rotary table, and
   said recording means stores a position code representing at least a position of said rotary table together with said identification code.

4. The image or video data processing system in accordance with claim 1, further comprising:
   data size gaining means for detecting an original data size of said in-frame compression data read out from said recording means;
   recording capacity gaining means for detecting a recording capacity of a portable recording medium storing said inter-frame compression data under control of said output control means; and
   code amount control means for calculating a target compression rate of said compression convening means based on the original data size of the readout in-frame compression data detected by said data size gaining means and the recording capacity of said portable recording medium detected by said recording capacity gaining means, said code amount control means controlling said compression converting means based on the calculated target compression rate so as to equalize a data amount of said inter-frame compression data with the recording capacity of said portable recording medium.

5. The image or video data processing system in accordance with claim 1, further comprising general interface means for transmitting said in-frame compression data read out from said recording means to said compression convening means which has a capability of judging image or video data.

6. The image or video data processing system in accordance with claim 1, wherein
   said compression converting means converts said in-frame compression data into said inter-frame compression data according to a MPEG (=motion picture expert group) 2 technique, and
   said output control means records said inter-frame compression data into a DVD-RAM disk with a format conformable to a DVD video recording standard.

* * * * *